United States Patent
Wallen et al.

(10) Patent No.: US 9,408,138 B2
(45) Date of Patent: Aug. 2, 2016

(54) METHOD, APPARATUS AND COMPUTER PROGRAM FOR CELL SEARCH

(71) Applicant: Telefonaktiebolaget L M Erisson (publ), Stockholm (SE)

(72) Inventors: Anders Wallen, Ystad (SE); Bengt Lindoff, Bjarred (SE); Pal Frenger, Linkoping (SE); Johan Bergman, Stockholm (SE); Konstantinos Dimou, San Francisco, CA (US)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 8 days.

(21) Appl. No.: 14/416,275

(22) PCT Filed: Apr. 15, 2013

(86) PCT No.: PCT/EP2013/057796
§ 371 (c)(1),
(2) Date: Jan. 21, 2015

(87) PCT Pub. No.: WO2014/169939
PCT Pub. Date: Oct. 23, 2014

(65) Prior Publication Data
US 2015/0282052 A1   Oct. 1, 2015

(51) Int. Cl.
*H04W 48/16* (2009.01)
*H04W 8/02* (2009.01)
*H04J 11/00* (2006.01)

(52) U.S. Cl.
CPC ........... *H04W 48/16* (2013.01); *H04J 11/0086* (2013.01)

(58) Field of Classification Search
CPC ..... H04W 48/16; H04W 36/14; H04W 48/18; H04W 48/20; H04W 88/06; H04W 48/08
See application file for complete search history.

(56) References Cited

U.S. PATENT DOCUMENTS

2011/0319076 A1* 12/2011 Ramasamy ........... H04W 48/16
455/434

(Continued)

FOREIGN PATENT DOCUMENTS

WO     2008/086648 A1     7/2008

OTHER PUBLICATIONS

PCT International Search Report, mailed Dec. 6, 2013, in connection with International Application No. PCT/EP2013/057796, all pages.

(Continued)

*Primary Examiner* — Quan M Hua
(74) *Attorney, Agent, or Firm* — Leffler Intellectual Property Law, PLLC (57) ABSTRACT

A method of cell search for a cellular communication device capable of operation in a normal coverage mode and in an extended coverage mode is disclosed. The method comprises retrieving a first list of frequencies for cell search comprising at least one frequency item; searching for cells using the frequency items of the first list in consecutive order until either a cell, which enables connection in the normal coverage mode, is found or the first list is exhausted, wherein if a cell is found which enables connection in the normal coverage mode, connecting to said cell for operation in the normal coverage mode, or if the first list is exhausted, retrieving a second list of frequencies, searching for cells using the frequency items of the second list in consecutive order until either a cell is found which enables connection in the extended coverage mode or the second list is exhausted, wherein if a cell is found which enables connection in the extended coverage mode, connecting to said cell for operation in the extended coverage mode. Method for a base station, a cellular communication device, a base station, and computer program therefore are also disclosed.

19 Claims, 5 Drawing Sheets

(56) References Cited

U.S. PATENT DOCUMENTS

| | | | |
|---|---|---|---|
| 2012/0276909 A1* | 11/2012 | Xiao | H04W 48/16 455/437 |
| 2014/0094127 A1 | 4/2014 | Dimou et al. | |
| 2014/0185465 A1 | 7/2014 | Balachandran et al. | |

OTHER PUBLICATIONS

PCT Written Opinion, mailed Dec. 6, 2013, in connection with International Application No. PCT/EP2013/057796, all pages.

International Preliminary Report on Patentability, mailed Jul. 6, 2015, in connection with International Application No. PCT/EP2013/057796, all pages.

\* cited by examiner

METHOD, APPARATUS AND COMPUTER PROGRAM FOR CELL SEARCH

TECHNICAL FIELD

The present invention generally relates to method, apparatus and computer program. In particular, the invention relates to cell search in cellular communications.

BACKGROUND

The current procedure and requirements for PLMN (Public Land Mobile Network) selection, cell selection, and cell reselection in legacy LTE systems are outlined in specifications, e.g. 3GPP TS 36.304. In summary, the UE shall scan viable radio frequency, RF, carrier frequencies in each supported operating band until it detects a suitable cell. The UE may have stored a list of carrier frequencies to be tried first, e.g. obtained from the Subscriber Identification Module, SIM, card (or equivalent), from a set of previously used carrier frequencies, or from a set of carriers signaled to the user in previous connections to the network. The UE typically first tries to connect on one of the frequencies belonging to the Home PLMN (HPLMN), i.e. belonging to the operator indicated by the SIM. If no cell belonging to the HPLMN is found, a more general scan is performed to detect cells belonging to a Visited PLMN (VPLMN). Once an allowed and otherwise suitable cell is found, the UE tries to attach to this network.

SUMMARY

According to a first aspect, there is provided a method of cell search for a cellular communication device capable of operation in a normal coverage mode and in an extended coverage mode. The method comprises retrieving a first list of frequencies for cell search comprising at least one frequency item. Furthermore, the method comprises searching for cells using the frequency items of the first list in consecutive order until either a cell, which enables connection in the normal coverage mode, is found or the first list is exhausted. Moreover, the method comprises, if a cell is found which enables connection in the normal coverage mode, connecting to said cell for operation in the normal coverage mode, or if the first list is exhausted, retrieving a second list of frequencies, searching for cells using the frequency items of the second list in consecutive order until either a cell is found which enables connection in the extended coverage mode or the second list is exhausted, and if a cell is found which enables connection in the extended coverage mode, connecting to said cell for operation in the extended coverage mode. The first and second lists of frequencies may possibly be idem.

The method may comprise, if the second list is exhausted, retrieving a third list of frequencies and a different setting for the extended coverage mode, searching for cells using the frequency items of the third list in consecutive order until either a cell is found which enables connection in the extended coverage mode with the different settings or the third list is exhausted, and if a cell is found which enables connection in the extended coverage mode, connecting to said cell for operation in the extended coverage mode with the different settings. The second and third lists of frequencies may possibly be idem.

Alternatively, the method may comprise, if the second list is exhausted, aborting cell search.

In some embodiments, the method may comprise, prior to searching for cells using the frequency items of the first list in consecutive order until either a cell is found which enables connection in the normal coverage mode, searching for cells using the frequency items of the first list in consecutive order until a cell is found which enables connection in the extended coverage mode and connecting to said cell for operation in the extended coverage mode. The method may then comprise continuing with the searching for cells using the frequency items of the first list in consecutive order until either a cell is found which enables connection in the normal coverage mode or the first list is exhausted. In addition, the method may comprise determining a cell search criterion, wherein the searching for cells using the frequency items of the first list in consecutive order until a cell is found which enables connection in the extended coverage mode and connecting to said cell for operation in the extended coverage mode is performed conditionally depending on the cell search criterion. The cell search criterion may comprise whether a time since connection operation to a cell which serves the cellular communication device or on which the cellular communication device is camping exceeds a threshold. The searching for cells using the frequency items of the first list in consecutive order until a cell is found which enables connection in the extended coverage mode and connecting to said cell for operation in the extended coverage mode may then be omitted if the time exceeds the threshold. Furthermore, the cell search criterion may be comprised in system information of the cell which serves the cellular communication device or on which the cellular communication device is camping transmitted to the cellular communication device, and the searching for cells using the frequency items of the first list in consecutive order until a cell is found which enables connection in the extended coverage mode and connecting to said cell for operation in the extended coverage mode may be omitted when the system information so indicates.

The frequency items of any of the above-mentioned lists may be based on history of earlier connections to cells. For example, the history of the earlier connections to a cell may include frequencies that have been used in the earlier connections to the cell. Alternatively or additionally, the history of the earlier connections to a cell may include frequencies that have earlier been signalled to the cellular communication device as part of system information or a dedicated message.

The frequency items of the list or lists may be pre-stored in the cellular communication device or in a device associated with the cellular communication device. The device associated with the cellular communication device may e.g. be a SIM (Subscriber Identity Module) card or the like.

According to a second aspect, there is provided a cellular communication device capable of operation in a normal coverage mode and in an extended coverage mode. The cellular communication device comprises a transceiver and a cell searcher mechanism. The cell searcher mechanism is arranged to control the transceiver upon cell searching to tune to different frequencies and detect whether respective cells provide appropriate signal properties. Furthermore, the cell searcher mechanism is arranged to determine a cell for connection for operation in the normal coverage mode or the extended coverage mode. The cell searcher mechanism is further arranged to operate according to the method of the first aspect.

The cellular communication device may e.g. be a mobile telephone, a cellular modem, or an equipment comprising a cellular modem. Such equipment comprising a cellular modem may e.g. be, but is not limited to, a machine-type communication (MTC) device.

According to a third aspect, there is provided a computer program product comprising computer-executable code with program instructions, which when executed on a processor of a cellular communication device causes the cellular communication device to perform the method according to the first aspect.

According to a fourth aspect, there is provided a method of a network node for managing cell search of a cellular communication device capable of operation in a normal coverage mode and in an extended coverage mode which is served by or camping on a cell operated by the network node. The method comprises determining whether the cellular communication device operates in extended coverage mode. If the cellular communication device operates in extended coverage mode, the network node transmits a signal to the cellular communication device comprising system information prompting the cellular communication device to retrieve a first list of frequencies for cell search comprising at least one frequency item and search for cells using the frequency items of the first list in consecutive order until either a cell, which enables connection in the normal coverage mode, is found or the first list is exhausted, and if a cell is found which enables connection in the normal coverage mode, connect to said cell for operation in the normal coverage mode.

According to a fifth aspect, there is provided a network node capable of managing cell search of a cellular communication device capable of operation in a normal coverage mode and in an extended coverage mode which is served by or camping on a cell operated by the base station. The network node is arranged to determine whether the cellular communication device operates in extended coverage mode. Furthermore, the network node is arranged to, if the cellular communication device operates in extended coverage mode, transmit a signal to the cellular communication device comprising system information prompting the cellular communication device to retrieve a first list of frequencies for cell search comprising at least one frequency item and search for cells using the frequency items of the first list in consecutive order until either a cell, which enables connection in the normal coverage mode, is found or the first list is exhausted, and if a cell is found which enables connection in the normal coverage mode, connect to said cell for operation in the normal coverage mode.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

In the description below the word User Equipment, UE, has been used for the sake of brevity; however, the invention is not limited to any particular type of UE, but can be applied to any kind of cellular communication device, including mobile phones, cellular modems, or equipment comprising a cellular modem. Equipment comprising a cellular modem may e.g. be a personal computer or the like, but may also be a machine-type communication device, such as a wireless sensor, etc.

For low cost Machine Type Communications (MTC), there is a desire to enhance coverage with 20 dB for low data rate, delay tolerant, primarily stationary, MTC devices operating in LTE networks. A typical use case where such a coverage enhancement would be beneficial is utility meters located deep inside buildings, but also other machine-type scenarios may be considered. The level of coverage enhancements needed may differ from a few dB up to 20 dB or more. To achieve these coverage enhancements the LTE system will need to be modified in several ways, including improved performance of physical channels and modified procedures. Embodiments of the invention focuses on the procedures for cell search and cell (re)selection.

The most common situation for stationary MTC devices, including the use case with utility meters in bad coverage, will probably be that only connection to the Home PLMN is desirable or even allowed. But for some scenarios, connection also to other PLMNs cannot be precluded. One could e.g. consider that different rules for national roaming might apply for stationary MTC devices compared to normal devices (e.g. smart phone UEs). Devices without coverage and with no mobility may e.g. require an operator to either install additional network nodes or to send out a "man in a van" to fix the coverage problem on location. These are both very expensive solutions and therefore the acceptance for an operator to simply pay another operator for providing access to an MTC device might be high.

Several functionalities, conveyed on different physical channels, need to be provided with enough quality for a UE to successfully connect to a cellular network. When this is achieved using legacy (e.g. LTE, Rel.8) signals and procedures, the UE is considered to operate in normal coverage mode. In order to connect to the network in normal coverage mode, the following steps are performed in the UE:

1. Read the primary and secondary synchronization signals (PSS and SSS, respectively),
2. Read system information in Master Information Block (MIB) and System Information Blocks (SIBs), at least enough to be able to
3. Initiate a random access channel (RACH) procedure, i.e., transmit a random access preamble on the physical random access channel (PRACH), receive a random access response from the network as acknowledgement of a detected PRACH signal, and transmit and receive additional messages in both directions to establish the connection.

When one or more of these functionalities fail using legacy signals and procedures, we consider the UE to be in bad coverage. For such UEs, alternative means of connecting to the network can be provided. Several possibilities to achieve this can be envisioned as has been disclosed elsewhere. Techniques for achieving enhanced, or extended, coverage include:

Accumulation of "legacy" signals in the receiver during longer times compared to normal operation.

Transmission of signals during longer times compared to normal operation, e.g. through repetition.

Increased transmission power and/or power spectral density.

Reduced message sizes, and/or new coding schemes.

New procedures and new signals, e.g. using other time/frequency resources.

Regardless of the techniques used, in embodiments of this invention it is considered that some mechanisms have been defined in order to provide enhanced, or extended, coverage. A corresponding UE is considered to operate in extended (or enhanced) coverage mode if it follows these mechanisms instead of operating in normal coverage mode.

The price paid by having a UE operate in extended coverage mode is typically that, for a given amount of information transfer, the amount of utilized physical resources in time, frequency and/or power is larger than for UEs operating in normal coverage mode. This can be categorized in different ways:

1. Additional downlink, DL, resources to be able for a UE in bad coverage to detect a cell. This may include common reference signals, synchronization signals, and broadcast of system information. This type of resources needs to be allocated regardless of if there currently are UEs in bad coverage or not, but possibly with very long transmission gaps assuming relatively relaxed requirements on acquisition time.

2. Additional uplink, UL, resources to be able to connect to the system, including e.g. larger time/frequency regions available for PRACH transmissions. Resources will have to be reserved for this, even when they are not used.

3. Additional UL and DL resources used for the active traffic by UEs in bad coverage.

This will result in lower spectral efficiency in the network, and reduction in the maximum system capacity. Thus, it is desired that as many devices as possible operate in normal coverage mode, and that the extended coverage mode is used only when needed. Hence there is need for a method and apparatus for ensuring that devices are not unnecessarily operating in extended coverage mode. A solution to this need is disclosed in the present application.

Embodiments of the invention concern the situation where a device is capable of connecting to a network in at least two different modes, where the different modes correspond to different coverage. In order to save system resources, approaches are presented to ensure that devices are not unnecessarily connected to the network using coverage enhancement techniques.

Several embodiments of the present invention can be envisioned. They differ, among other things, in what type of prior information is available, and what kind of restrictions that the UE is subject to regarding what cells the UE may connect to.

First, let us consider different embodiments of the invention where the UE has a list of frequencies to search for cells on. One advantage of such a list is that the UE may start by searching on a few candidate frequencies, as opposed to scanning a raster of fairly high resolution (valid carrier frequencies are typically in steps of 100 kHz) over all supported operating bands. Several options how this list is obtained are possible, including, but not limited to being retrieved from the SIM card (or equivalent), from the application layer in the UE, from a set of previously used carrier frequencies, or from a set of carriers signaled to the UE in previous connections to the network. Let us now consider the cell search and network connection procedure for such a UE by referring to FIG. 1.

Figure 1:
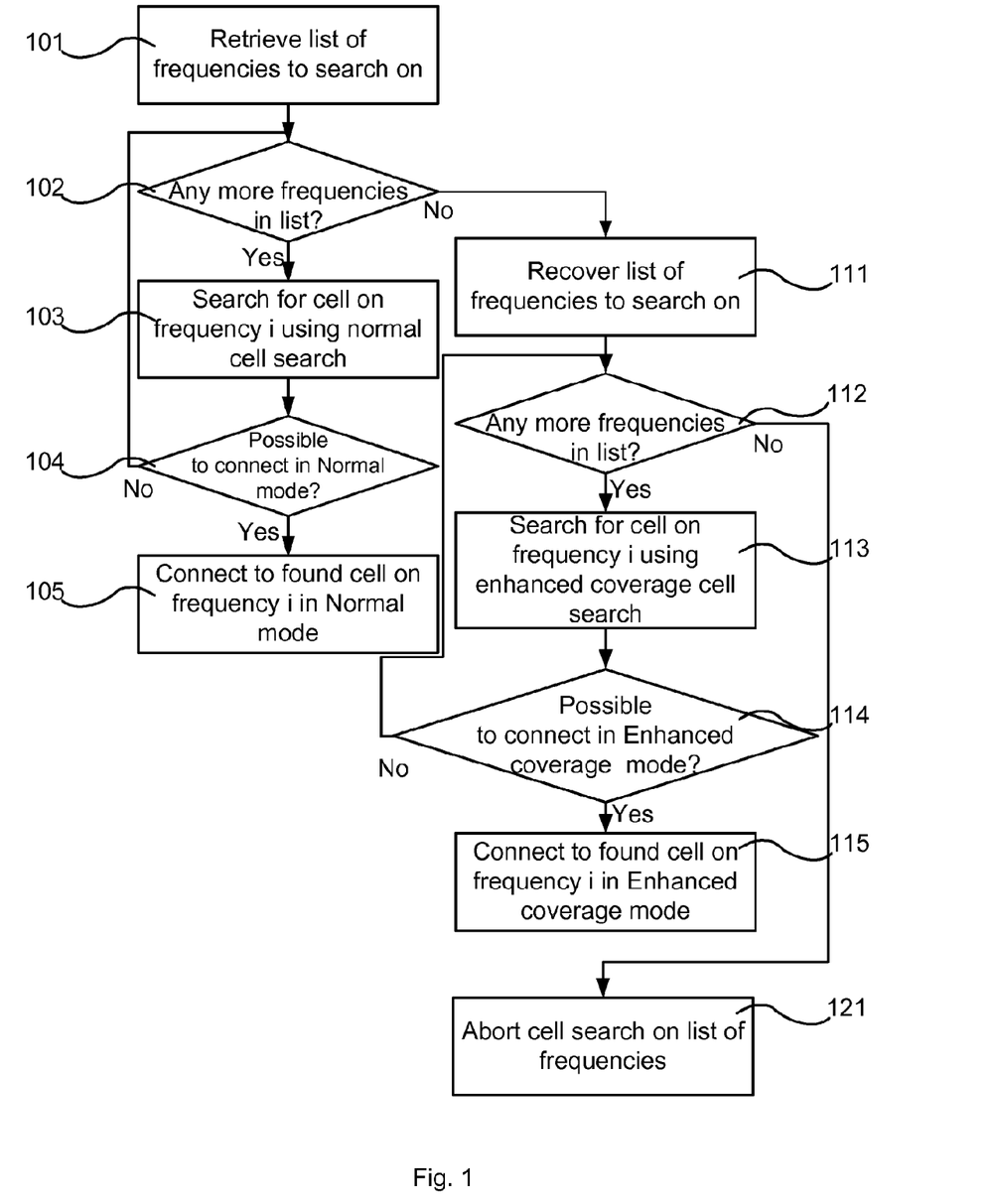
FIG. 1 is a flow chart illustrating a method according to an embodiment.

FIG. 1 is a flow chart schematically illustrating a method of cell search for a UE (or cellular communication device). As discussed above, the UE is capable of operation in at least a normal coverage mode and an extended coverage mode. As also discussed above, the UE retrieves 101 a first list of frequencies for cell search comprising at least one frequency item. The retrieval can be from the SIM card (or equivalent), from the application layer in the UE, from a set of previously used carrier frequencies, or from a set of carriers signaled to the UE in previous connections to the network. Since the aim is to establish connection according to the less resource consuming normal coverage mode, as discussed above, the UE searches 103 for cells using the frequency items of the first list in consecutive order until either a cell, which enables connection in the normal coverage mode, is found 104 or the first list is exhausted 102. If a cell is found which enables connection in the normal coverage mode, the UE connects 105 to said cell for operation in the normal coverage mode. If the first list is exhausted 102, the UE retrieves 111 a second list of frequencies, wherein it searches 113 for cells using the frequency items of the second list in consecutive order until either a cell is found 114 which enables connection in the extended coverage mode or the second list is exhausted 112. If a cell is found 114 which enables connection in the extended coverage mode, the UE connects 115 to said cell for operation in the extended coverage mode. If the second list is exhausted 112, cell search can be aborted 121, or at least the procedure of doing cell search using the lists of known frequencies.

In other words, steps 101-105 represent an attempt to connect to the network in normal coverage mode, covering the legacy procedure for cell search. It starts by the UE retrieving 101 a list (above "first list") of frequencies $f_i$ to search, and if there is a first frequency $f_1$ in the list, which is checked 102, the UE tries to find 103 a cell using normal cell search procedure. As an option, the order of the frequencies in the list can be randomized in some way before the search starts, as a way to balance the load from the different UEs over the available frequencies. If a suitable cell is found 104 and possible to connect to, the UE connects 105 to the cell in normal coverage mode, otherwise it tries to find 102 another frequency $f_i$ to search on in the list of known frequencies. When the UE has traversed the list of known frequencies, i.e. the frequencies of the list, without being able to connect to the network in normal coverage mode, the UE will recover 111 the list (above "second list") of known frequencies to search on and try to connect once more, now in extended coverage mode following the steps 112-115. The list of known frequencies could be the same for normal coverage mode and for extended coverage mode (i.e., the first list and the second list may be the same) or it could be two separate lists (i.e. the first and the second may be different lists, which could possibly be partly overlapping lists, or could possibly be lists where one list is a subset of the other list). Details on how the extended coverage mode cell search procedure is performed are not further elaborated here, but may include repetition, and/or any of the other coverage enhancement techniques above, at least in some of the steps. For example, the cell search may be performed by receiving the legacy PSS and SSS signals, but accumulate them over a longer time period than during normal cell search in order to being able to find also weaker cells. If no cell to connect to is found among the known frequencies, the cell search procedure using known frequencies is aborted 121.

The procedure in FIG. 1 ensures that a UE will not connect to a network in extended coverage mode unless it has failed to connect to any network in normal coverage mode. Note for example that it is possible that the UE has found a cell using normal cell search procedure in step 103, but not being able to connect in step 104 due to e.g. inability to read system information, or failure to connect in the random access procedure.

Instead of attempting to connect to the cell in extended coverage mode directly, the UE will return to step 102 to try to connect to the network in normal coverage mode using another frequency.

Several alternative embodiments can be envisioned. For example, there may be more than one type of extended coverage mode defined, each one typically associated with a different amount of additional acceptable path loss, e.g. measured in dB. The different types of extended coverage mode may, but are not restricted to, just use different number of required repetitions of signals. Furthermore, the different types of extended coverage mode may consume more or less system resources, e.g. in sense of time/frequency/power.

Figure 2:
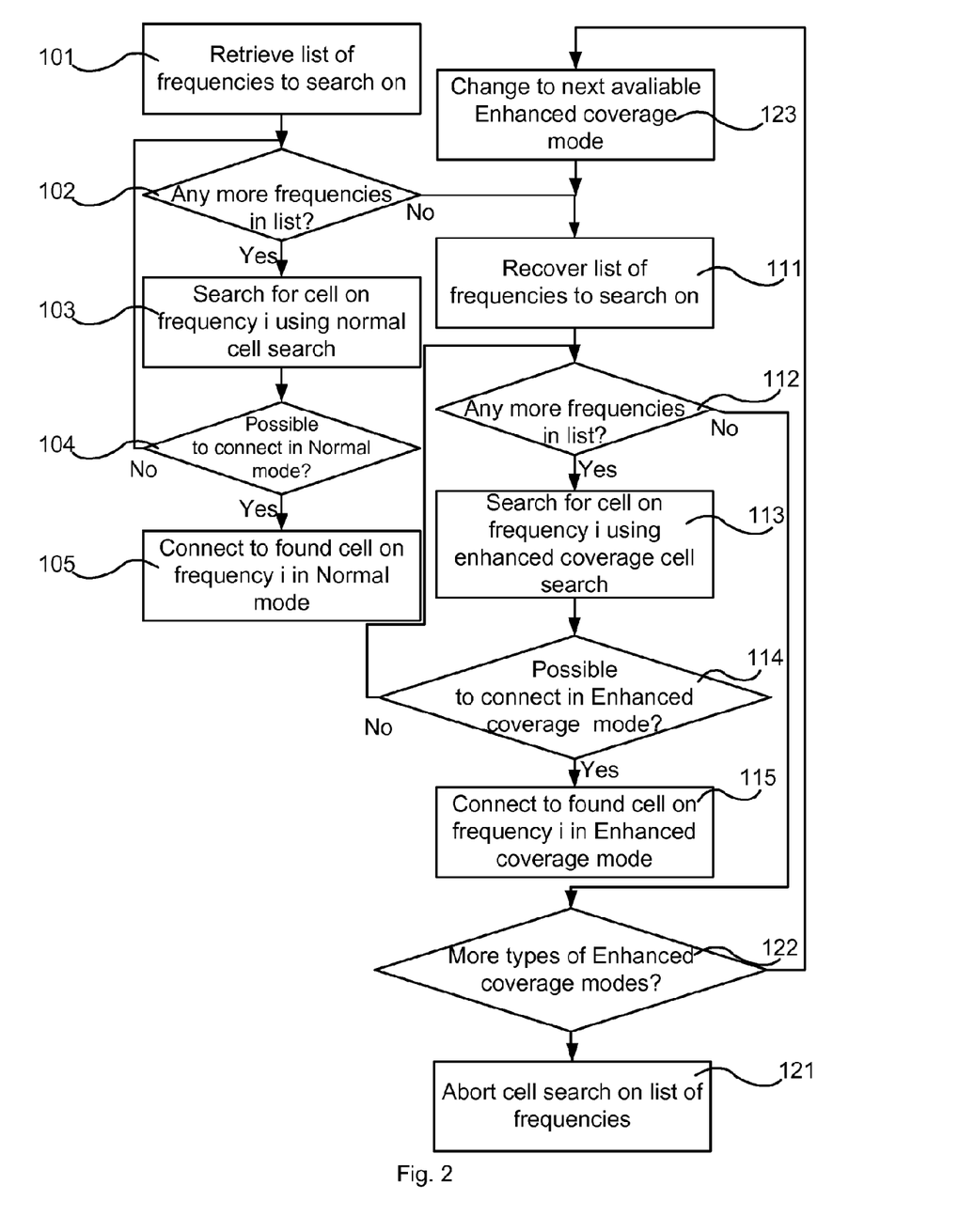
FIG. 2 is a flow chart schematically illustrating a method according to an embodiment.

To illustrate how these can be used, reference is made to FIG. 2. It is similar to the procedure in FIG. 1, except that before aborting 121 cell search, it is evaluated 122 if there are more types of extended coverage modes available, i.e. extended coverage modes with different settings. If so, parameters and other settings of the extended coverage mode cell search procedure are modified 123, and the steps 111-115 are repeated with these new settings. The typical use case of the procedure in FIG. 2 is to start with a procedure that offers a moderate coverage enhancement, e.g. 5 dB, and gradually increase degrees of repetitions etc. in steps of e.g. 5 dB until a suitable cell is found, or until the mode offering maximum coverage enhancement, e.g. 20 dB, has been tried unsuccessfully.

In some scenarios, a UE following the procedures of FIGS. 1 and 2 may never have been connected to any network, and the list of known frequencies can then be provided from the SIM card or e.g. from the application layer in the UE. It can then try all available frequencies in the list, possibly in some predetermined order of priority.

In other scenarios, the UE has previously been connected to the network, in which case it has some prior knowledge on what frequencies it is likely to be able to connect to. This may be used to sort the list of frequencies in steps 101 and 111; in particular, to start with frequencies for which it has been successfully connected to cells in normal coverage mode, then frequencies for which it has been connected to cells in extended coverage mode. For low mobility scenarios, it is very likely that the UE succeeds in connecting to the same cell again, and in the same operating mode as the last time. Thus, a first list of frequencies and a second list of frequencies can have been populated with frequency items accordingly.

Figure 3:
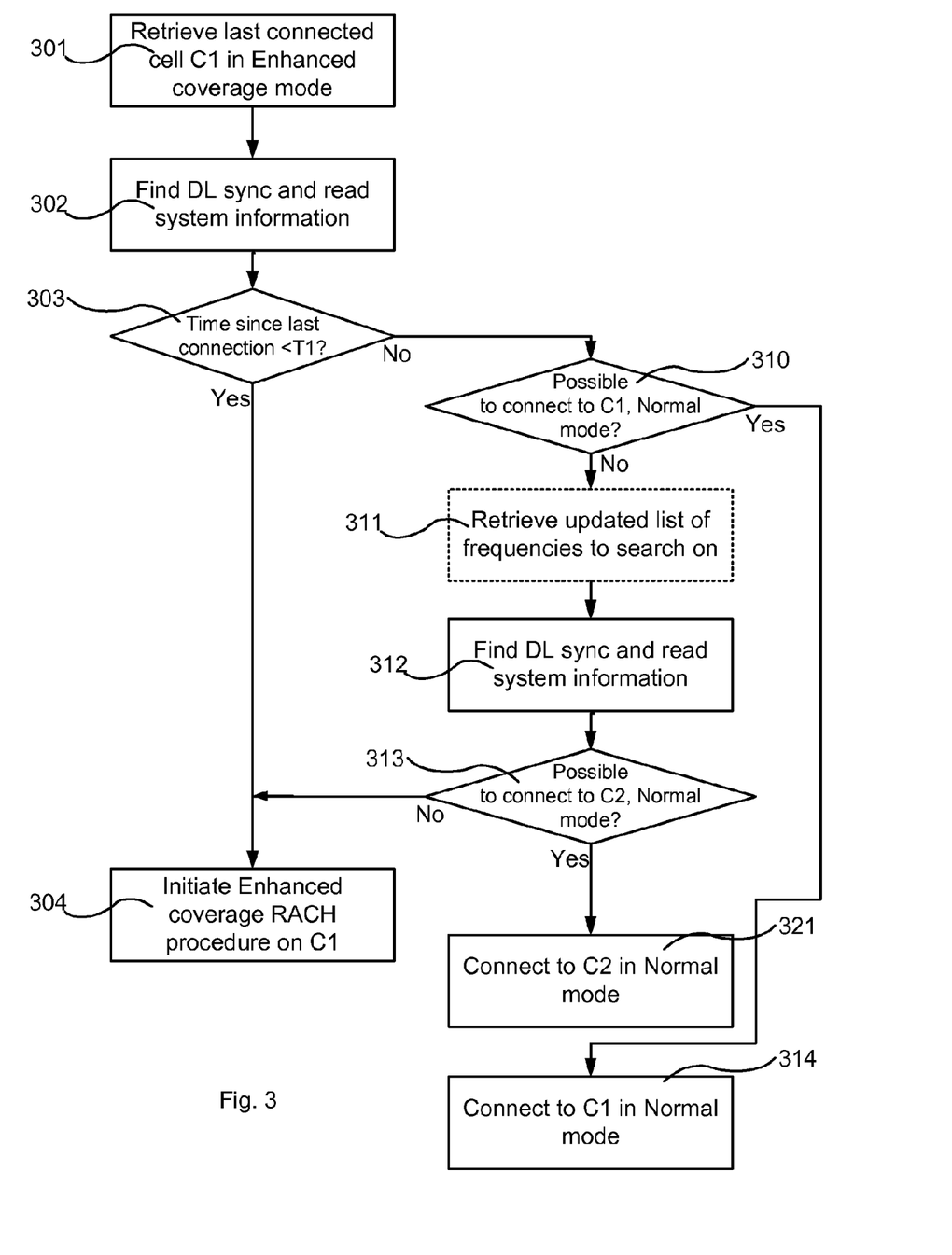
FIG. 3 is a flow chart schematically illustrating a method according to an embodiment.

However, the radio network environment may also have changed since the latest connection, which motivates embodiments illustrated by the procedure in FIG. 3. Here the starting point is that the UE has previously been connected to the network in extended coverage mode. When it is again time to connect to the network, the last cell C1 that the UE was connected to is retrieved 301, and synchronized to in terms of finding DL time and frequency sync and (optionally) reading 302 system information. It is determined 303 whether a time since last connection to C1 is smaller than a threshold T1. If the time since last connection to C1 is smaller than a threshold T1, the status of the radio environment of the UE can be considered to be up-to-date, and the UE can be allowed to continue the connection to C1 by initiating 304 a RACH procedure associated with the extended coverage mode. If, on the other hand, the time since last connection to C1 is larger than T1, the UE instead checks 310 whether it is possible to connect to C1 using normal coverage mode. For example, the UE may have moved towards the cell C1 and hence come into normal coverage mode range. If connection using normal coverage mode to C1 is possible, the UE connects 314 to C1 using normal coverage mode. In one embodiment this check may be made in relation to the reading 302 of system information to get synchronization state. If there is no success when checking 310 the possibility to connect to C1 using normal coverage mode, the UE is requested to look for a cell to connect to in normal coverage mode, cf. steps 101-105 as demonstrated with reference to FIG. 1. Optionally, the UE will first try to retrieve 311 an updated list of frequencies, in case reading updated system information is possible, for example to reflect that a new cell may have been deployed in the network. The update may for example be transmitted via system information in cell C1. The UE searches 312 for a cell C2 to connect to in normal coverage mode on the (possibly updated) list of possible frequencies. The UE checks 313 whether C2 was found and whether it is possible to connect to C2 using normal coverage mode. If no such cell C2 is found, the UE is again allowed to continue the connection 304 to C1 by initiating a RACH procedure associated with the extended coverage mode. If the check 313 indicates that it is possible to connect to C2 in normal coverage mode, the UE connects 321 to C2 using the normal coverage mode. Here, only two cells were tried, but as is understood from what is demonstrated with reference to FIG. 1, a list of frequencies can be considered for trying to connect using the normal coverage mode.

In an alternative embodiment, step 303 is performed prior to step 302, i.e. the time issue is considered first. In yet another embodiment, step 303 does not test the time since last connection, but rather the time since last evaluation of possible cells to connect to in normal coverage mode.

In a further embodiment of the current invention, UEs/devices/sensors being aware that they are stationary, according to for example as discussed in U.S. patent application Ser. No. 13/633,728 and/or U.S. patent application Ser. No. 13/728,360, may perform the procedure of FIG. 3 by executing step 304 after step 302.

In a further embodiment of the current invention, the threshold T1 of FIG. 3 may be set upon consideration of the mobility pattern of the UE according to for example as discussed in U.S. patent application Ser. No. 13/633,728 and/or U.S. patent application Ser. No. 13/728,360. Namely for devices known to be stationary, the threshold T1 is set to much higher value (by adding an offset, $T_{stationary}$) than for moving UEs. Hence, stationary UEs more often proceed to step 304 from step 303 compared to moving UEs.

The purpose of the procedure in FIG. 3, and variants of it, is to force a UE to at least occasionally perform a search for cells to connect to in a cell in normal coverage mode before connecting in extended coverage mode. The principle to regularly check for cells to connect to in normal coverage mode may be applicable to UEs in all connection states, such as an Idle state (e.g. RRC_IDLE) or a connected state (e.g. RRC_CONNECTED), and with arbitrary discontinuous reception, DRX, patterns configured. Different values of the threshold T1 can be used in different connection states or for different DRX patterns.

Furthermore, a request to search for cells to connect to in normal coverage mode can be initiated by other means. This includes signalling from the network, e.g. when a new cell in the vicinity of the current serving cell has been deployed or otherwise become active. A request may also be initiated from the application layer in the UE.

A network node, such as a base station, may also request a UE to initiate a search for an alternative cell to connect to. The alternative cell may require an extended coverage mode even though the MTC device is currently connected to the serving cell using a normal coverage mode. As an example, a small cell in the coverage area of an umbrella cell may enter a dormant mode when the traffic is low e.g. in order to reduce network energy consumption. Currently connected MTC devices can then be requested to search for an alternative cell to connect to. In case it is not possible to connect to any other cell using a normal coverage mode, then the MTC device might still be able to attach to an umbrella cell using an extended coverage mode. If this is the case then the small cell may enter dormant mode and the MTC device is then instructed (or forced) to attach to the alternative umbrella cell using an extended coverage mode. When the small cell becomes active again it can inform the umbrella about this and the umbrella cell may then request the MTC device to search for a normal coverage mode cell to connect to, which can be performed for example as described in the section above.

Figure 4:
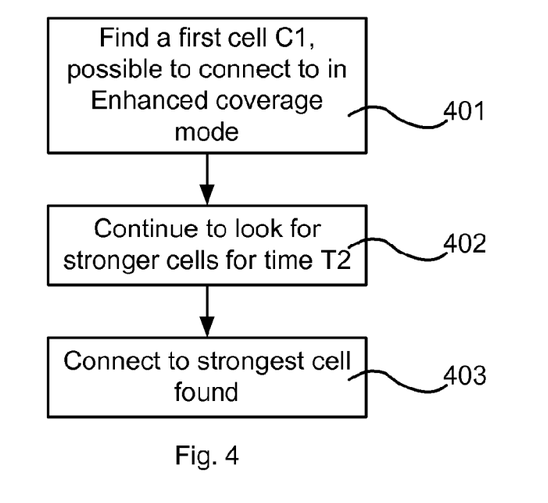
FIG. 4 is a flow chart schematically illustrating a method according to an embodiment.

In all embodiments described above, it has been assumed that the UE has a list of frequencies to search on. For scenarios where no explicit list is available at all, the methods above can still be applied, since the UE then has an implicit list of frequencies to test, as given by the supported operating bands of the UE, together with a specified raster of possible carrier frequencies. This will be a more time consuming search, since there are many more frequencies to test, and together with the fact that a UE in bad coverage typically needs significantly longer time to find a cell, the total search times may become overly extensive. In particular, it may be more acceptable to connect to a first found cell in extended coverage mode before the whole search space has been covered. A high-level description of this is found in FIG. 4, where a weak first cell C1 is identified 401. Before connecting to C1, the UE will continue to look 402 for a stronger cell C2 for a time T2 that may be predetermined in the UE or signalled from the network, e.g. in some broadcasted system information, or in a dedicated message. After time T2, the UE will connect 403 to the strongest cell found. Note that the step 402 may include search for cells to connect to both in normal coverage mode and in extended coverage mode, e.g. as demonstrated above with reference to FIG. 1 or 2. Furthermore, it may include search on other frequencies than C1, as well as the same frequency as C1. The latter may be relevant if e.g. cells transmitting special sync signals intended for UEs in extended coverage mode and these sync signals are transmitted at different time instances for different cells.

Thus, prior to searching for cells using the frequency items of the list until either a cell is found which enables connection in the normal coverage mode, searching for cells using the list until a cell is found which enables connection in the extended coverage mode is performed, and connecting to said cell for operation in the extended coverage mode. Then, the UE continues with the searching for cells using the frequency items of the list until either a cell is found which enables connection in the normal coverage mode or the first list is exhausted. This can be controlled based on a cell search criterion. The cell search criterion can be determined, wherein the searching for cells which enables connection in the extended coverage mode and connecting to a cell for operation in the extended coverage mode can be performed conditionally depending on the cell search criterion. The cell search criterion can comprise whether a time since connection operation to a cell which serves the UE or on which the UE is camping exceeds a threshold, wherein the searching for cells using the frequency items of the list in consecutive order until a cell is found which enables connection in the extended coverage mode and connecting to said cell for operation in the extended coverage mode is omitted if the time exceeds the threshold. The cell search criterion can be comprised in system information of the cell which serves the UE or on which the UE is camping transmitted to the UE, wherein the searching for cells using the frequency items of the list in consecutive order until a cell is found which enables connection in the extended coverage mode and connecting to said cell for operation in the extended coverage mode is omitted when the system information so indicates, i.e. the system information requires a try to connect using the normal coverage mode. Timing constraints can also in this case make that the UE still connects to a found cell using the extended coverage mode.

A corresponding method of a base station can be employed for managing cell search of the UE capable of operation in a normal coverage mode and in an extended coverage mode which is served by or camping on a cell operated by the base station. In brief, the method comprises determining whether the UE operates in extended coverage mode, wherein, if the UE operates in extended coverage mode, the base station may transmit, depending on considerations made for managing the network, a signal to the UE comprising system information prompting the UE to retrieve a first list of frequencies for cell search comprising at least one frequency item and search for cells using the frequency items of the first list in consecutive order until either a cell, which enables connection in the normal coverage mode, is found or the first list is exhausted, wherein if a cell is found which enables connection in the normal coverage mode, connecting to said cell for operation in the normal coverage mode.

The described embodiments can be varied in several ways, for example depending on different scenarios and use cases. As mentioned above, the list of frequencies to search on, and corresponding cells to connect to, may be restricted to ones belonging to a single operator, typically the Home PLMN. However, if also cells belonging to a Visited PLMN are accepted, different rules may apply to cells depending on what PLMN they belong to. It may for example be possible that any HPLMN cell has higher priority than any VPLMN cell, even if the HPLMN cell only can be connected to in extended coverage mode but the VPLMN cell can be connected to in normal coverage mode. In other scenarios, agreements between operators may prioritize cells reachable in normal coverage mode before extended coverage mode is used.

Figure 5:
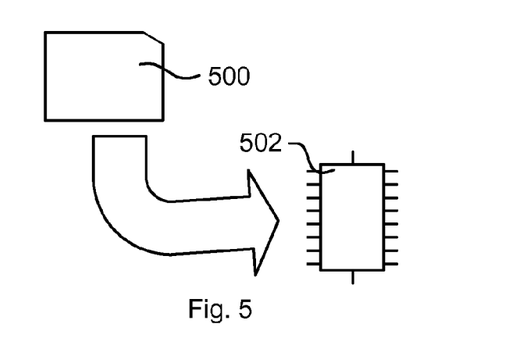
FIG. 5 schematically illustrates a non-transitory computer readable medium with a computer program stored thereon, and a processing device for executing the computer program.

The methods according to the present invention are suitable for implementation with aid of processing means, such as computers and/or processors, especially for the case where the UE demonstrated above is controlled by a digital processor. Therefore, there is provided computer programs, comprising instructions arranged to cause the processing means, processor, or computer to perform the steps of any of the methods according to any of the embodiments described with reference to FIGS. 1 to 4. The computer programs preferably comprises program code which is stored on a computer readable medium 500, as illustrated in FIG. 5, which can be loaded and executed by a processing means, processor, or computer 502 to cause it to perform the methods, respectively, according to embodiments of the present invention, preferably as any of the embodiments described with reference to FIGS. 1 to 4. The computer 502 and computer program product 500 can be arranged to execute the program code sequentially where actions of the any of the methods are performed stepwise. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

Figure 6:
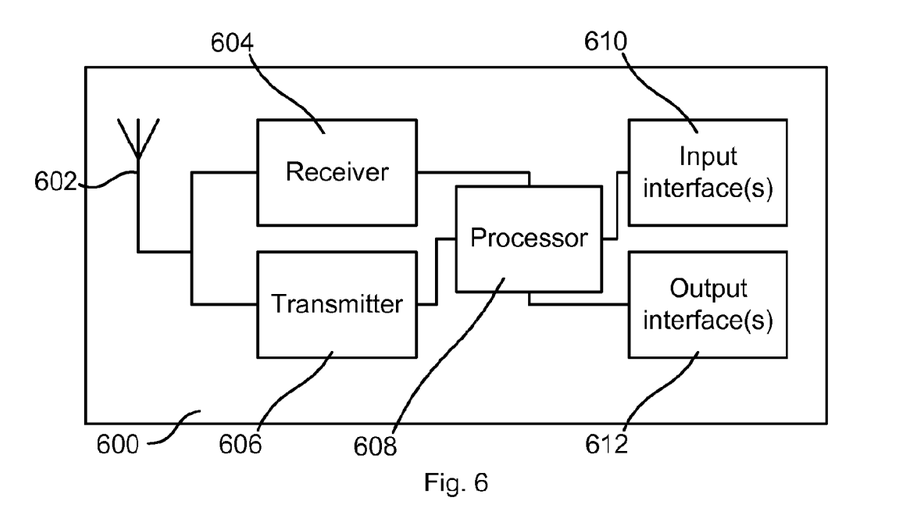
FIG. 6 is a block diagram schematically illustrating a communication device according to embodiments.

FIG. 6 is a block diagram schematically illustrating a UE 600 according to embodiments. The UE 600, which for example can be a mobile terminal, or a communication card e.g. in a laptop, controller of a machine or other processing device, has been referred to a "UE" above. The device 600 comprises a transceiver arrangement including an antenna arrangement 602, a radio receiver 604, and a radio transmitter 606. The device 600 further signal processing means 608, and one or more interfaces 610, 612, e.g. electrical, optical, or user interfaces. The transceiver arrangement handles wireless communication with cellular communication entities such as a base station, but may also be enabled to communicate with other entities comprising a transceiver, and optionally also other entities, e.g. with sensors by wired or wireless communication. Inputs and outputs from and to the wireless operations are provided to and from the further signal processing means 608. The further signal processing means 608 is enabled to interact through the one or more interfaces 610, 612. The further processing means 608 are here representing both signal processing means as well as processing means for providing one or more controllers to control operation of the device 600. Thus, the processing means 608 can implement the herein described methods, as elucidated with reference to FIG. 5. In particular, the processing means 608 implements a cell searcher mechanism arranged to control the transceiver 604, 606 upon cell searching to tune to different frequencies and detect whether respective cells provide appropriate signal properties and determine a cell for connection for operation in the normal coverage mode or the extended coverage mode, wherein the cell searcher mechanism is arranged to operate according to any of the methods as demonstrated above.

Figure 7:
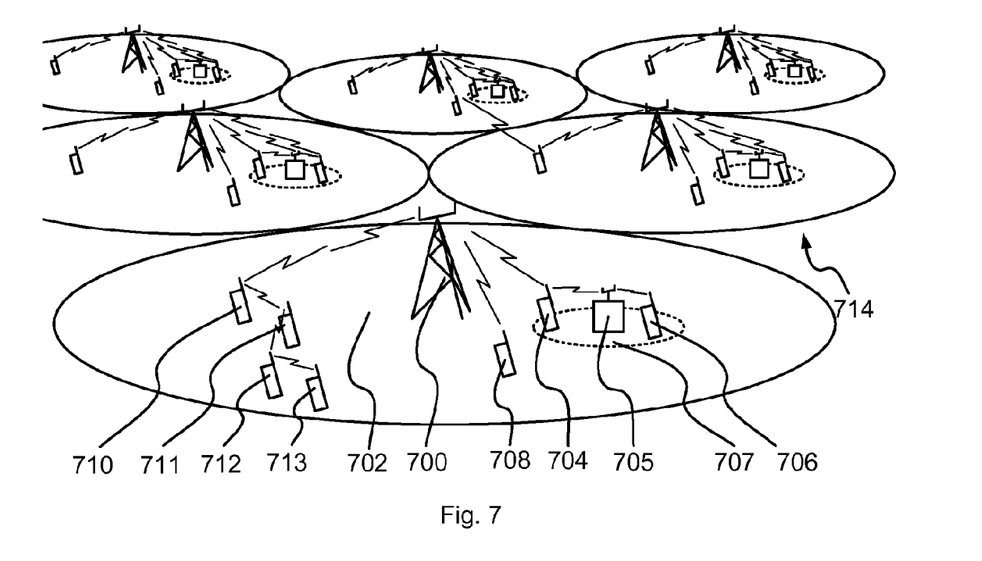
FIG. 7 schematically illustrates a part of a cellular wireless communication system.

FIG. 7 schematically illustrates a part of a cellular wireless communication system for providing an access network, and elements that may be involved in communication with a network node according to an embodiment. A base station 700 operates a cell 702, and a number of devices 704, 705, 706, 708, 710, 711, 712, 713 are assumed to operate within or close to the cell 702. A plurality of similar cells 714 are also provided in the wireless cellular communication system. A UE of the cellular wireless communication system may gain access and/or desired communication through different ways. For example: the UE 708 gains access through the base station 700 as also the UE 710, the UE 706 gains access through a base station 705 which operates a pico or femto cell 707 and UE 704 can be seen as making a handover from the base station 700 to the base station 705. To manage connections to an appropriate one of the cells, cell search is a necessary task for the UEs.

Figure 8:
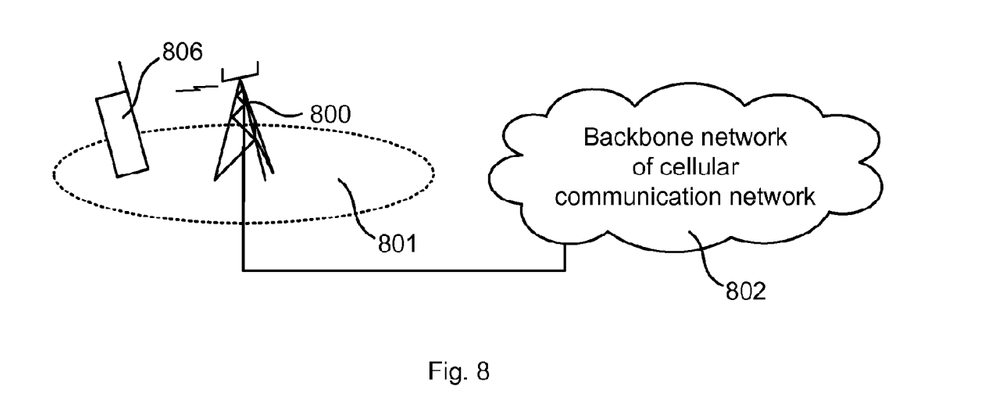
FIG. 8 schematically illustrates a network node according to an embodiment.

FIG. 8 schematically illustrates a network node 800 according to an embodiment. The network node 800, which can e.g. be what is often referred to as a base station or eNodeB, has backhaul capability to a backbone network 802 of its cellular communication network. Considering a UE 806 desiring to provide a service requiring communication with the backbone network 802, e.g. to access the Internet via a gateway provided through the backbone network 802, needs to establish communication with the network node 800, which has been demonstrated above. Furthermore, in some embodiments, the network node 800 can be arranged to manage cell search of the UE which is capable of operation in a normal coverage mode and in an extended coverage mode which is served by or camping on a cell 801 operated by the network node 800. For example, in an embodiment, the network node 800 is arranged to determine whether the UE operates in extended coverage mode. Furthermore, the network node 800 is arranged to, if the UE operates in extended coverage mode, transmit a signal to the UE comprising system information prompting the UE to retrieve a first list of frequencies for cell search comprising at least one frequency item and search for cells using the frequency items of the first list in consecutive order until either a cell, which enables connection in the normal coverage mode, is found or the first list is exhausted, and if a cell is found which enables connection in the normal coverage mode, connect to said cell for operation in the normal coverage mode.

The invention claimed is:

1. A method of cell search for a cellular communication device capable of operation in a normal coverage mode and in an extended coverage mode, wherein the method comprises:
   retrieving a first list of frequencies for cell search comprising at least one frequency item;
   searching for cells using the frequency items of the first list in consecutive order until either a cell, which enables connection in the normal coverage mode, is found or the first list is exhausted; and
   if a cell is found which enables connection in the normal coverage mode, connecting to said cell for operation in the normal coverage mode; or
   if the first list is exhausted, retrieving a second list of frequencies, searching for cells using the frequency items of the second list in consecutive order until either a cell is found which enables connection in the extended coverage mode or the second list is exhausted, and if a cell is found which enables connection in the extended coverage mode, connecting to said cell for operation in the extended coverage mode.

2. The method of claim 1, comprising: if the second list is exhausted, retrieving a third list of frequencies and a different setting for the extended coverage mode, searching for cells using the frequency items of the third list in consecutive order until either a cell is found which enables connection in the extended coverage mode with the different setting or the third list is exhausted, and if a cell is found which enables connection in the extended coverage mode, connecting to said cell for operation in the extended coverage mode with the different setting.

3. The method of claim 2, wherein the second and third lists of frequencies are idem.

4. The method of claim 1, wherein if the second list is exhausted, aborting cell search.

5. The method of claim 1, wherein the first and second lists of frequencies are idem.

6. The method of claim 1, comprising, prior to searching for cells using the frequency items of the first list in consecutive order until either a cell is found which enables connection in the normal coverage mode, searching for cells using the frequency items of the first list in consecutive order until a cell is found which enables connection in the extended coverage mode and connecting to said cell for operation in the extended coverage mode, and then continuing with the searching for cells using the frequency items of the first list in consecutive order until either a cell is found which enables connection in the normal coverage mode or the first list is exhausted.

7. The method of claim 6, further comprising determining a cell search criterion, wherein the searching for cells using the frequency items of the first list in consecutive order until a cell is found which enables connection in the extended coverage mode and connecting to said cell for operation in the extended coverage mode is performed conditionally depending on the cell search criterion.

8. The method of claim 7, wherein the cell search criterion comprises whether a time since connection operation to a cell which serves the cellular communication device or on which the cellular communication device is camping exceeds a threshold, and the searching for cells using the frequency items of the first list in consecutive order until a cell is found which enables connection in the extended coverage mode and connecting to said cell for operation in the extended coverage mode is omitted if the time exceeds the threshold.

9. The method of claim 7, wherein the cell search criterion is comprised in system information of the cell which serves the cellular communication device or on which the cellular communication device is camping transmitted to the cellular communication device, wherein the searching for cells using the frequency items of the first list in consecutive order until a cell is found which enables connection in the extended coverage mode and connecting to said cell for operation in the extended coverage mode is omitted when the system information so indicates.

10. The method of claim 1, wherein the frequency items of the list or lists are based on history of earlier connections to cells.

11. The method according to claim 10, wherein the history of the earlier connections to a cell include frequencies that have been used in the earlier connections to the cell.

12. The method according to claim 10, wherein the history of the earlier connections to a cell include frequencies that have earlier been signalled to the cellular communication device as part of system information or a dedicated message.

13. The method of claim 1, wherein the frequency items of the list or lists are pre-stored in the cellular communication device or in a device associated with the cellular communication device.

14. A cellular communication device capable of operation in a normal coverage mode and in an extended coverage mode and comprising:
   a transceiver; and
   a cell searcher mechanism arranged to
      control the transceiver upon cell searching to tune to different frequencies and detect whether respective cells provide appropriate signal properties; and
      determine a cell for connection for operation in the normal coverage mode or the extended coverage mode,
   wherein the cell searcher mechanism is further arranged to operate according to a method of cell search for a cellular communication device capable of operation in a normal coverage mode and in an extended coverage mode, wherein the method comprises:
   retrieving a first list of frequencies for cell search comprising at least one frequency item;
   searching for cells using the frequency items of the first list in consecutive order until either a cell, which enables connection in the normal coverage mode, is found or the first list is exhausted; and
   if a cell is found which enables connection in the normal coverage mode, connecting to said cell for operation in the normal coverage mode; or
   if the first list is exhausted, retrieving a second list of frequencies, searching for cells using the frequency items of the second list in consecutive order until either a cell is found which enables connection in the extended coverage mode or the second list is exhausted, and if a cell is found which enables connection in the extended coverage mode, connecting to said cell for operation in the extended coverage mode.

15. The cellular communication device according to claim 14, wherein the cellular communication device is a mobile telephone, a cellular modem, or an equipment comprising a cellular modem.

16. The cellular communication device according to claim 15, wherein the equipment comprising a cellular modem is a machine-type communication, MTC, device.

17. A non-transitory computer-readable storage medium comprising computer-executable code with program instructions, which when executed on a processor of a cellular communication device causes the cellular communication device to perform a method of cell search for a cellular communication device capable of operation in a normal coverage mode and in an extended coverage mode, wherein the method comprises:
   retrieving a first list of frequencies for cell search comprising at least one frequency item;
   searching for cells using the frequency items of the first list in consecutive order until either a cell, which enables connection in the normal coverage mode, is found or the first list is exhausted; and
   if a cell is found which enables connection in the normal coverage mode, connecting to said cell for operation in the normal coverage mode; or
   if the first list is exhausted, retrieving a second list of frequencies, searching for cells using the frequency items of the second list in consecutive order until either a cell is found which enables connection in the extended coverage mode or the second list is exhausted, and if a cell is found which enables connection in the extended coverage mode, connecting to said cell for operation in the extended coverage mode.

18. A method of a network node for managing cell search of a cellular communication device capable of operation in a normal coverage mode and in an extended coverage mode which is served by or camping on a cell operated by the network node, wherein the method comprises:
   determining whether the cellular communication device operates in extended coverage mode, wherein, if the cellular communication device operates in extended coverage mode, the network node transmits a signal to the cellular communication device comprising system information prompting the cellular communication device to retrieve a first list of frequencies for cell search comprising at least one frequency item and search for cells using the frequency items of the first list in consecutive order until either a cell, which enables connection in the normal coverage mode, is found or the first list is exhausted, and if a cell is found which enables connection in the normal coverage mode, connect to said cell for operation in the normal coverage mode.

19. A network node capable of managing cell search of a cellular communication device capable of operation in a normal coverage mode and in an extended coverage mode which is served by or camping on a cell operated by the base station, wherein the network node comprises a processor to cause the network node to:
   determine whether the cellular communication device operates in extended coverage mode,
   if the cellular communication device operates in extended coverage mode, transmit a signal to the cellular communication device comprising system information prompting the cellular communication device to retrieve a first list of frequencies for cell search comprising at least one frequency item and search for cells using the frequency items of the first list in consecutive order until either a cell, which enables connection in the normal coverage mode, is found or the first list is exhausted, and
   if a cell is found which enables connection in the normal coverage mode, connect to said cell for operation in the normal coverage mode.

* * * * *